(12) United States Patent
Yamada et al.

(10) Patent No.: US 12,434,727 B2
(45) Date of Patent: Oct. 7, 2025

(54) NOTIFICATION DEVICE AND NOTIFICATION METHOD

(71) Applicants: TOYOTA JIDOSHA KABUSHIKI KAISHA, Toyota (JP); AISIN CORPORATION, Aichi-ken (JP)

(72) Inventors: Kenta Yamada, Tokyo-to (JP); Takuhiro Omi, Anjo (JP); Hiroshi Morimoto, Tokyo-to (JP); Udara Eshan Manawadu, Tokyo-to (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 140 days.

(21) Appl. No.: 18/221,243

(22) Filed: Jul. 12, 2023

(65) Prior Publication Data

US 2024/0067201 A1 Feb. 29, 2024

(30) Foreign Application Priority Data

Aug. 26, 2022 (JP) .................................. 2022-135291

(51) Int. Cl.
*B60W 50/14* (2020.01)
*B60W 60/00* (2020.01)

(52) U.S. Cl.
CPC ........ *B60W 50/14* (2013.01); *B60W 60/0053* (2020.02)

(58) Field of Classification Search
None
See application file for complete search history.

(56) References Cited

U.S. PATENT DOCUMENTS

2005/0083211 A1* 4/2005 Shafir ................ G01C 21/3697
340/995.13
2010/0131148 A1* 5/2010 Camhi ................... B60W 40/09
701/31.4

(Continued)

FOREIGN PATENT DOCUMENTS

JP 2010-044493 A 2/2010
JP 2011-123733 A 6/2011

(Continued)

OTHER PUBLICATIONS

Black Tesla, Tesla v8.0 Autopilot—Warning Interval & Autosteer Unavailable, Sep. 24, 2016, Youtube, https://www.youtube.com/watch?v=isZ3fSbE_pg&t=322s (Year: 2016).*

*Primary Examiner* — James J Lee
*Assistant Examiner* — Andrew Sang Kim
(74) *Attorney, Agent, or Firm* — Oliff PLC (57) ABSTRACT

A notification device detecting a predetermined action of a driver of a vehicle in which travel is controlled by an autonomous driving system from a driver image including a face region representing a face of the driver and outputting a confidence rate indicating a certainty in the detection, specifying a message for inhibiting a control ending action which possibly follows the detected action and corresponds to an ending condition of control by the autonomous driving system, and notifying the driver of the specified message through an output device when an effectiveness level is higher than a predetermined notification threshold, the effectiveness level calculated by multiplying the confidence rate by a first probability of the control ending action being inhibited when notifying the driver of the specified message or by a second probability of the control ending action being performed when not notifying the driver of the specified message.

9 Claims, 7 Drawing Sheets

(56) References Cited

U.S. PATENT DOCUMENTS

2016/0046298 A1* 2/2016 DeRuyck ............. B60K 28/066
340/576
2020/0062275 A1* 2/2020 Higgins ............... G05D 1/0088
2020/0365003 A1 11/2020 Noro

FOREIGN PATENT DOCUMENTS

JP 2017-194822 A 10/2017
JP 2019-133402 A 8/2019

* cited by examiner

| ACTION | DETECTED CONTENTS | | | | | | |
|---|---|---|---|---|---|---|---|
| | TERMINAL | BOOK | FACIAL ORIENTATION (HANDS) | FACIAL ORIENTATION (DASHBOARD) | FACIAL ORIENTATION (INTERIOR OF VEHICLE) | SEAT INCLINED BACK | ... |
| STARING AT TERMINAL | ✓ | | | ✓ | | | ... |
| OPERATING TERMINAL | ✓ | | ✓ | | | | ... |
| READING BOOK | | ✓ | ✓ | | | | ... |
| LOOKING AROUND INTERIOR | | | | | ✓ | | ... |
| RELAXING | | | | | | ✓ | ... |
| ... | ... | ... | ... | ... | ... | ... | ... |

| ACTION | CONTROL ENDING ACTION | | | | | |
|---|---|---|---|---|---|---|
| | CAMERA BLOCKED | SLEEPING | FACE LOST | SEAT LEFT | DRIVING ENVIRONMENT | ... |
| STARING AT TERMINAL | ✓ | | | | | ... |
| OPERATING TERMINAL | ✓ | | | | | ... |
| READING BOOK | ✓ | | | | | ... |
| LOOKING AROUND INTERIOR | | | ✓ | | | ... |
| RELAXING | | ✓ | ✓ | ✓ | a | ... |
| ... | ... | ... | ... | ... | ... | ... |

| CONTROL ENDING ACTION | MESSAGE | PROBABILITY OF INHIBITION |
|---|---|---|
| CAMERA BLOCKED | PLEASE BE CAREFUL NOT TO BLOCK INTERIOR CAMERA. | 0.6 |
| FALLING ASLEEP AT WHEEL | IF YOU CLOSE YOUR EYES CONTINUOUSLY FOR 5 SECONDS OR MORE, AN ALARM WILL SOUND. PLEASE DO NOT CLOSE YOUR EYES. | 0.5 |
| FACE LOST | IF YOUR EYES CANNOT BE DETECTED FROM THE CAMERA FOR 10 SECONDS OR MORE, AN ALARM WILL SOUND. | 0.7 |
| SEAT LEFT | PLEASE RETURN TO A DRIVING POSTURE IN 10 SECONDS. PLEASE DO NOT LEAVE THE DRIVER'S SEAT. | 0.7 |
| DRIVING ENVIRONMENT | DUE TO SUDDEN CHANGES IN THE DRIVING ENVIRONMENT, YOU MAY BE ASKED TO TAKE OVER DRIVING IN 10 SECONDS. | |
| | a. PLEASE DO NOT OVERLY LOWER OR OVERLY INCLINE BACK THE SEAT. | 0.6 |
| | b. PLEASE SECURE A PLACE TO PUT ASIDE OBJECTS. | 0.8 |
| | c. PLEASE RETURN TO A DRIVING POSTURE WITHIN 10 SECONDS. | 0.6 |
| | d. PLEASE PUT ON YOUR EYEGLASSES OR PLACE THEM AT A READILY ACCESSIBLE PLACE. | 0.7 |
| | e. PLEASE PUT ON YOUR SHOES OR PLACE THEM WHERE THEY CAN BE QUICKLY PUT ON. | 0.5 |
| ... | ... | ... |

NOTIFICATION DEVICE AND NOTIFICATION METHOD

FIELD

The present disclosure relates to a notification device and notification method notifying a driver of a vehicle of a message.

BACKGROUND

Certain actions by a driver of a vehicle such as sleeping, eyes off the traveling direction, and an unstable posture are not preferable for continuing safe travel of a vehicle. The warning device for a vehicle described in Japanese Unexamined Patent Publication No. 2019-133402 detects a driver sleeping or eyes off and sounds an alarm to the driver.

SUMMARY

In a vehicle in which travel is controlled by an autonomous driving system at an autonomous driving level where, for example, a driver has no duty of monitoring the surroundings, the driver is allowed to engage in various non-driving actions (for example, operating a smartphone). However, a nondriving action which, for example, interrupts the confirmation on the availability of the driver for a transition from autonomous driving to manual driving (for example, an operated smartphone hides the eyes of the driver from a driver monitor camera), which would invite a situation where autonomous driving could not be suitably continued, is regarded as the subject of an alert warning the end of control by the autonomous driving system. However, it is not easy for a driver to understand in advance what kind of nondriving action would invite such a situation and cause an alert.

It is an object of the present disclosure to provide a notification device that can suitably notify a driver of a vehicle of a message so that autonomous driving can be continued longer.

A notification device according to the present disclosure includes a processor configured to detect a predetermined action of a driver of a vehicle in which travel is controlled by an autonomous driving system from a driver image including a face region representing a face of the driver and output a confidence rate indicating a certainty in that detection. The processor of the notification device is further configured to specify a message for inhibiting a control ending action which possibly follows the detected action and corresponds to an ending condition of control by the autonomous driving system. The processor of the notification device is further configured to notify the driver of the specified message through an output device when an effectiveness level is higher than a predetermined notification threshold. The effectiveness level is calculated by multiplying the confidence rate by a first probability of the control ending action being inhibited when notifying the driver of the specified message or by a second probability of the control ending action being performed when not notifying the driver of the specified message.

The processor of the notification device according to the present disclosure, in the notification, preferably inhibits notification of the specified message when an elapsed time period from a point of time at which an identical message as the specified message was recently notified is shorter than a predetermined message interval threshold.

The processor of the notification device according to the present disclosure, in the detection, preferably further detects a control ending action of the driver from the driver image and, in the notification, notifies a prior end notice of control by the autonomous driving system in accordance with detection of the control ending action through an output device in a mode with greater strength than that used for notification of the message.

The processor of the notification device according to the present disclosure in the notification preferably inhibits notification of the specified message when an elapsed time period from a point of time at which the prior end notice based on detection of the control ending action corresponding to the specified message was recently notified is shorter than a predetermined prior end notice interval threshold longer than the message interval threshold.

A notification method according to the present disclosure comprises detecting a predetermined action of a driver of a vehicle in which travel is controlled by an autonomous driving system from a driver image including a face region representing a face of the driver and outputting a confidence rate indicating a certainty in the detection, specifying a message for inhibiting a control ending action which possibly follows the detected action and corresponds to an ending condition of control by the autonomous driving system, and notifying the driver of the specified message through an output device when an effectiveness level is higher than a predetermined notification threshold, the effectiveness level calculated by multiplying the confidence rate by a first probability of the control ending action being inhibited when notifying the driver of the specified message or by a second probability of the control ending action being performed when not notifying the driver of the specified message.

A computer program for notification stored in a non-transitory computer readable medium according to the present disclosure causes a computer mounted on a vehicle to execute a process including detecting a predetermined action of a driver of the vehicle in which travel is controlled by an autonomous driving system from a driver image including a face region representing a face of the driver and outputting a confidence rate indicating a certainty in that detection, specifying a message for inhibiting a control ending action which possibly follows the detected action and corresponds to an end condition of control by the autonomous driving system, and notifying the driver of the specified message through an output device when an effectiveness level is higher than a predetermined notification threshold, the effectiveness level calculated by multiplying the confidence rate by a first probability of the control ending action being inhibited when notifying the driver of the specified message or by a second probability of the control ending action being performed when not notifying the driver of the specified message.

According to the notification device according to the present disclosure, it is possible to suitably notify a driver of a vehicle of a message so that autonomous driving can be continued longer.

DESCRIPTION OF EMBODIMENTS

A notification device that suitably notifies a driver of a vehicle of a message so that of autonomous driving can be continued longer will be now described in detail. The notification device detects a predetermined action of a driver of a vehicle in which travel is controlled by an autonomous driving system from a driver image including a face region representing a face of the driver and outputs a confidence rate indicating a certainty of the detection. The notification device specifies a message for inhibiting a control ending action which possibly follows the detected action and corresponds to an ending condition of control by the autonomous driving system. The notification device calculates an effectiveness level indicating an effectiveness of message notification for inhibition of a control ending action following the detected action by multiplying the confidence rate by a first probability of a control ending action being inhibited when notifying the driver of a specified message or by a second probability of a control ending action being performed when not notifying the driver of the specified message. Further, the notification device notifies the driver of the specified message through an output device when the calculated effectiveness level is higher than a predetermined notification threshold.

Figure 1:
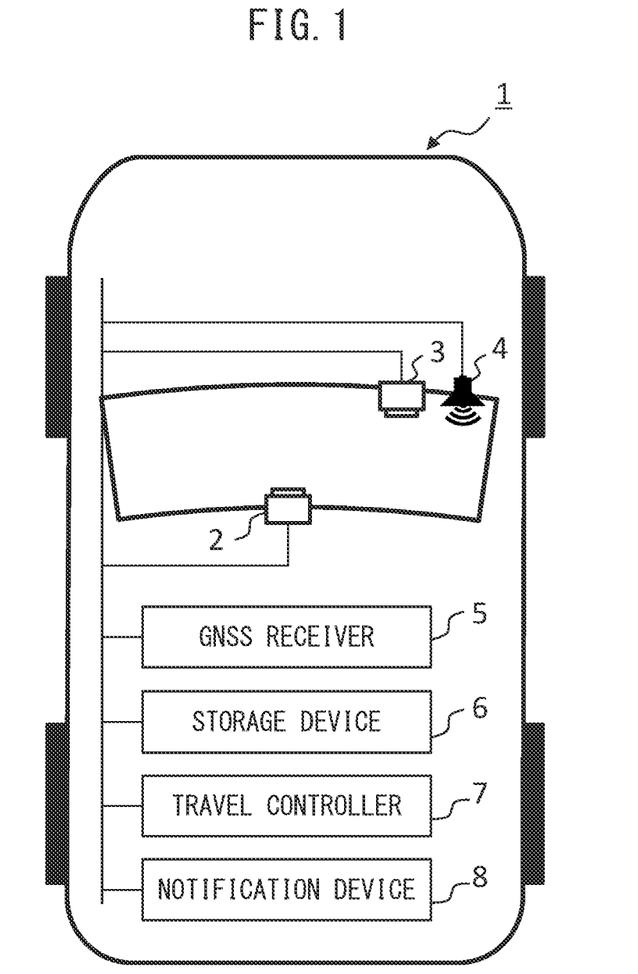
FIG. 1 schematically illustrates the configuration of a vehicle equipped with a notification device.

FIG. 1 schematically illustrates the configuration of a vehicle equipped with a notification device.

The vehicle 1 includes a surrounding camera 2, a driver monitor camera 3, a speaker device 4, a global navigation satellite system (GNSS) receiver 5, a storage device 6, a travel controller 7, and a notification device 8. The surrounding camera 2, the driver monitor camera 3, the speaker device 4, the GNSS receiver 5 and the storage device 6, and, the travel controller 7 and the notification device 8 are connected via an in-vehicle network conforming to a standard, such as a controller area network, so that they can communicate with each other.

The surrounding camera 2 is an example of a surrounding sensor for generating surrounding data representing surroundings of the vehicle 1. The surrounding camera 2 includes a two-dimensional detector constructed from an array of optoelectronic transducers, such as CCD or C-MOS, having sensitivity to visible light and a focusing optical system that forms an image of a target region on the two-dimensional detector. The surrounding camera 2 is disposed, for example, in a front and upper area in the interior of the vehicle and oriented forward, takes pictures of the state of the surroundings of the vehicle 1 through a windshield every predetermined capturing period (e.g., $\frac{1}{30}$ to $\frac{1}{10}$ seconds), and outputs a surrounding image as surrounding data representing the surroundings of the vehicle 1.

The driver monitor camera 3 is an example of a driver sensor for capturing the face of the driver of the vehicle 1 and generating a driver image. The driver monitor camera 3 includes a two-dimensional detector constructed from an array of optoelectronic transducers, such as CCD or C-MOS, having sensitivity to infrared light and a focusing optical system that forms an image of a target region on the two-dimensional detector. Further, the driver monitor camera 3 has a light source emitting infrared light. The driver monitor camera 3 is, for example, mounted in a front area in the interior of the vehicle 1 and oriented toward the face of the driver seated on the driver's seat. The driver monitor camera 3 emits infrared light to the driver every predetermined capturing period (e.g., $\frac{1}{30}$ to $\frac{1}{10}$ seconds) and outputs driver images including the face region representing the face of the driver in time series.

The speaker device 4, which is an example of an output device, for example has an amplifier and a speaker. The speaker device 4 outputs a voice message in accordance with a signal received through the in-vehicle network from the notification device 8. The vehicle 1 may also have a display device having a liquid crystal display as the output device. Further, the output device may also be a light source that emits light in a pattern in accordance with the content of the message, a vibrator vibrating in a pattern in accordance with the content of the message.

The GNSS receiver 5, which is an example of a positioning sensor, receives GNSS signals from GNSS satellites at predetermined intervals and determines the position of the vehicle 1 based on the received GNSS signals. The GNSS receiver 5 outputs a positioning signal indicating the result of determination of the position of the vehicle 1 based on the GNSS signals to the travel controller 7 via the in-vehicle network at predetermined intervals.

The storage device 6, which is an example of a storage unit, includes, for example, a hard disk drive or a nonvolatile semiconductor memory. The storage device 6 contains high precision maps including information representing lane lines demarcating lanes in a predetermined region shown in the high precision map.

The travel controller 7 is an electronic control unit (ECU) provided with a communication interface, a memory, and a processor. The travel controller 7 reads out information representing lane lines in the surroundings of vehicle 1 indicated by a positioning signal received from the GNSS receiver 5 from the storage device 6 storing high precision maps. The travel controller 7 detects lane lines of the surroundings from the surrounding images received from the surrounding camera 2 and identifies the lane in which the vehicle 1 is traveling by comparing them with lane lines in the high precision maps. The travel controller 7 detects other vehicles and other surrounding objects in the surroundings from the surrounding images received from the surrounding camera 2 and generates a travel route so as to maintain a predetermined interval from the objects and maintain or change lanes according to the situation. The travel controller 7 outputs control signals to travel mechanisms (not shown) of the vehicle 1 so that the vehicle 1 travels along the travel route. The surrounding camera 2, the GNSS receiver 5, the storage device 6, and the travel controller 7 which cooperate to realize autonomous driving are examples of the autonomous driving system. The travel mechanisms include, for example, an engine or motor supplying power to the vehicle 1, an accelerator for adjusting the acceleration rate of the vehicle 1, a brake for reducing the traveling speed of the vehicle 1, and a steering mechanism for steering the vehicle 1.

The travel controller 7 can control the travel of the vehicle 1 by an autonomous driving level (SAE's autonomous driving level 3) where the driver is not required to monitor the surroundings under the predetermined condition such as the vehicle speed is in a predetermined range and the behaviors of the traffic participants in the surroundings are not complicated. While travel of the vehicle 1 is controlled by the autonomous driving level 3, the driver can perform tasks other than driving (for example, operating a smartphone or relaxing).

When the condition of travel control by the autonomous driving level 3 is no longer satisfied, the travel controller 7 requests the driver to take over at least a part of the tasks relating to travel of the vehicle 1 such as monitoring the surroundings and controlling the travel mechanisms. In this case, if the driver is in a state that he/she cannot quickly take over tasks, safe travel of the vehicle 1 becomes difficult. Therefore, when the travel controller 7 detects the state of the driver from a driver image received from the driver monitor camera 3 and finds the driver sleeping, leaving the seat, or otherwise in the state that he/she cannot quickly take over the tasks, it issues an alert to the driver through the speaker device 4. The travel controller 7 also issues an alert to the driver through the speaker device 4 when it cannot detect the condition of the driver from the driver image, for example, when the face of the driver is hidden from the driver monitor camera 3, or when the eyes of the driver cannot be detected for a predetermined time period, since it becomes unclear whether the driver can take over the tasks.

The travel controller 7 decelerate the vehicle 1 to stop at a road shoulder or other safe place when it still cannot confirm whether the driver can take over the tasks even after the alert.

The notification device 8 is an ECU provided with a communication interface, a memory, and a processor. The notification device 8 notifies the driver of a message through the speaker device 4 based on the actions of the driver detected from a driver image received from the driver monitor camera 3. The notification device 8 may be implemented in the same ECU as the ECU in which the travel controller 7 is implemented.

Figure 2:
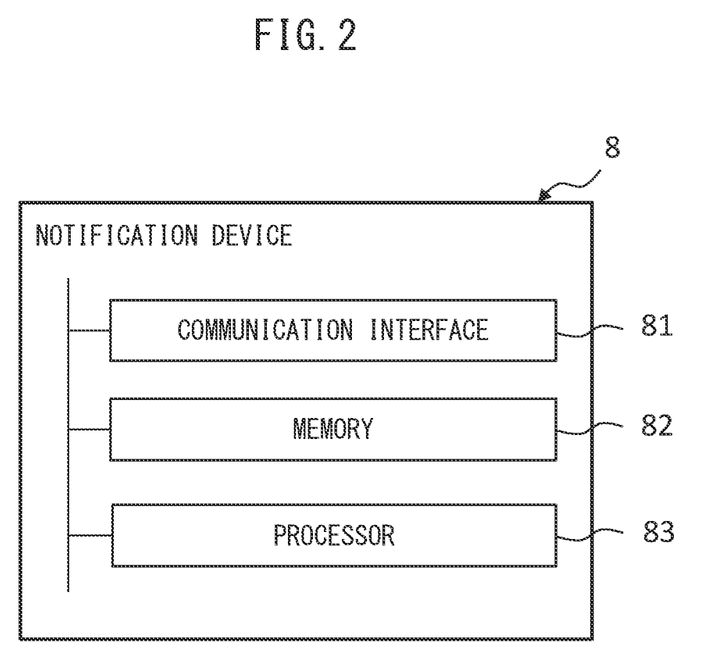
FIG. 2 schematically illustrates hardware of a notification device.

FIG. 2 schematically illustrates the hardware of the notification device 8. The notification device 8 includes a communication interface 81, a memory 82, and a processor 83.

The communication interface 81, which is an example of a communication unit, includes a communication interface circuit for connecting the notification device 8 to the in-vehicle network. The communication interface 81 provides received data to the processor 83. Further, the communication interface 81 outputs data provided from the processor 83 to an external device.

The memory 82, which is another example of a storage unit, includes volatile and nonvolatile semiconductor memories. The memory 82 contains various types of data used for processing by the processor 83, e.g., an action detection table associating states of the driver detected from the driver image and predetermined actions of the driver, a control ending action table associating control ending actions which follow actions for each predetermined action detected from a driver image, a message table associating messages for inhibiting control ending actions for each control ending action, etc. The memory 82 also stores various application programs, for example, a notification program for performing notification processing.

Figure 3:
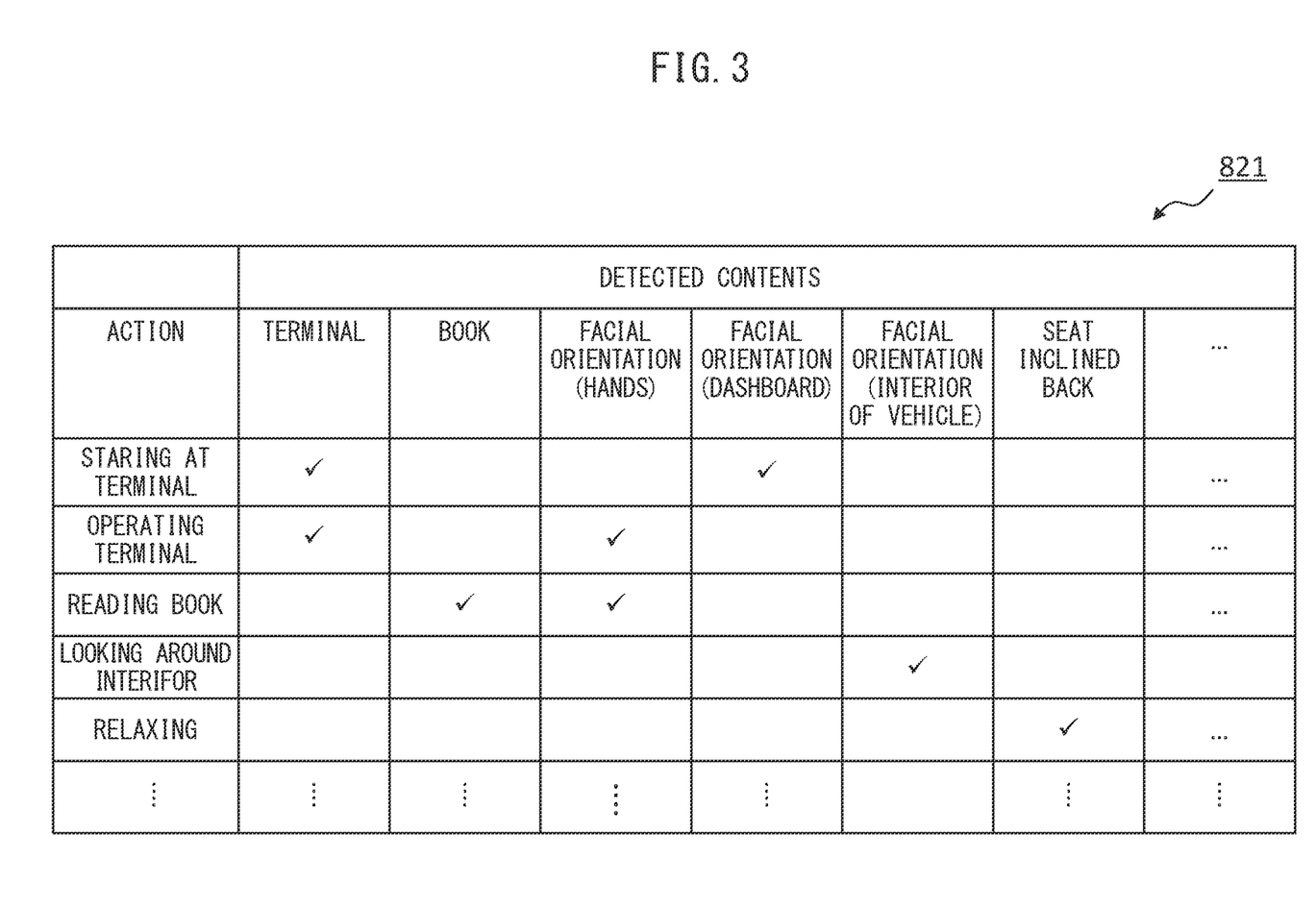
FIG. 3 explains an outline of an action detection table.

FIG. 3 explains an outline of an action detection table. The memory 82 stores the action detection table associating the contents detected from driver images and predetermined actions of the driver.

In the action detection table 821, for example, the action "staring at terminal" is associated with the detected content "terminal" and "facial orientation (dashboard)". This means that, when a terminal (information terminal such as smartphone and tablet) and the orientation of the face of the driver turning to the dashboard are detected from the driver image, the action "staring at terminal" should be detected.

In the action detection table 821, for example, the action "looking around interior" is associated with the detected content "facial orientation (interior of vehicle)". This means that, when the orientation of the face of the driver turning to the interior of the vehicle such as the navigator's seat/back seats is detected from the driver image for a predetermined time period (for example 5 seconds) or more, the action "looking around interior" should be detected.

In the action detection table 821, for example, the action "relaxing" is associated with the detected content "seat inclined back". This means that when an action of the driver moving back the driver's seat or inclining the driver's seat back is detected from the driver image, the action "relaxing" should be detected. In place of detection of the action of the driver moving back the driver's seat or inclining of the driver's seat back, the action "relaxing" may also be detected when detecting that the position of the head of the driver is further to the back than usual.

Figure 4:
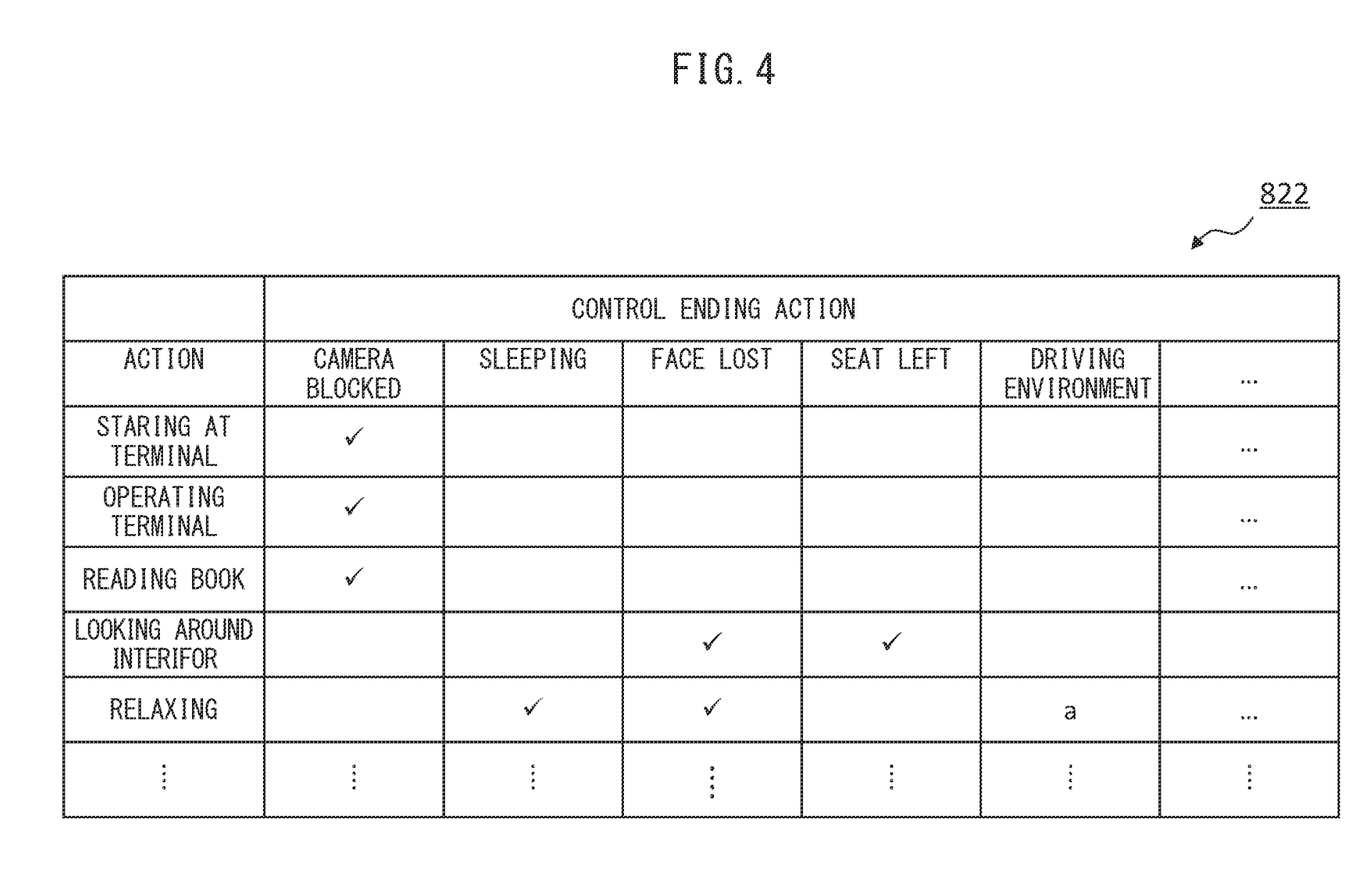
FIG. 4 explains an outline of a control ending action table.

FIG. 4 explains an outline of a control ending action table. The memory 82 stores the control ending action table associating each predetermined action detected from a driver image with a corresponding control ending action.

In the control ending action table 822, for example, the action "staring at terminal" is associated with the control ending action "camera blocked". This means that when the action "staring at terminal" is detected from the driver image, the control ending action "camera blocked" possibly follows this. The control ending action "camera blocked" corresponds to the state where the face of the driver is not represented in the driver image by reason that the face of the driver is outside the field of the driver monitor camera 3 or there is an obstacle between the face of the driver and the driver monitor camera 3. The control ending action "camera blocked" is treated as an end condition of control by the travel controller 7 since it invites a state where the driver monitor camera 3 can no longer suitably generate a driver image including the face region and the condition of the driver can no longer be determined.

In the control ending action table 822, for example, the action "looking around interior" is associated with the control ending action "face lost" and "seat left". This means that when an action "looking around interior" is detected from the driver image, at least one of the control ending actions "face lost" and "seat left" possibly follow. The control ending action "face lost" corresponds to the state where the eyes of driver cannot be detected from the driver image since the driver is not facing the direction of the driver monitor camera 3. The control ending action "face lost" is treated as an end condition of control by the travel controller 7 since it invites a state where the driver monitor camera 3 can no longer suitably generate a driver image including the face region and the condition of the driver can no longer be determined. The control ending action "seat left" corresponds to a state where the driver leaves the driver's seat. The control ending action "seat left" is treated as an end condition of control for the travel controller 7, since it invites a state where the driver can no longer suitably take over the tasks relating to travel of the vehicle 1.

In the control ending action table 822, for example, the action "relaxing" is associated with the control ending action "sleeping", "face lost", and the control ending action "driving environment" with a symbol "a". This means that when the action "relaxing" is detected from a driver image, at least one of the control ending actions "sleeping", "face lost", and "a" of the "driving environment" possibly follow. The control ending action "sleeping" indicates that the degree of wakefulness is falling below a predetermined threshold while the driver is sitting in the driver's seat and is treated as an end condition of control by the travel controller 7 since it invites a state where the driver can no longer suitably take over the tasks relating to travel of the vehicle 1. The control ending action "driving environment" indicates that, based on predetermined actions of the driver, a driving environment may be expected to fall into a situation where the driver can no longer suitably take over the tasks relating to travel of the vehicle 1 and is treated as an end condition of control by the travel controller 7. In the control ending action table 822, symbols respectively indicate the types of driving environments that can be caused by predetermined actions. The symbol "a" corresponds to a driving environment of "moving seat" in the control ending action "driving environment", which indicates the situation that the driver is moving the driver's seat backward or reclining the driver's seat. In these driving environments, the driver can be in a relaxed state and the driver possibly cannot suitably take over tasks relating to driving of the vehicle 1. In the control ending action "driving environment", other types of driving environments are indicated with a symbol "b" (object placed in surroundings of driver seat), a symbol "c" (the driver changing his/her posture), a symbol "d" (the driver removing his/her eyeglasses), and a symbol "e" (the driver taking off his shoes).

Figure 5:
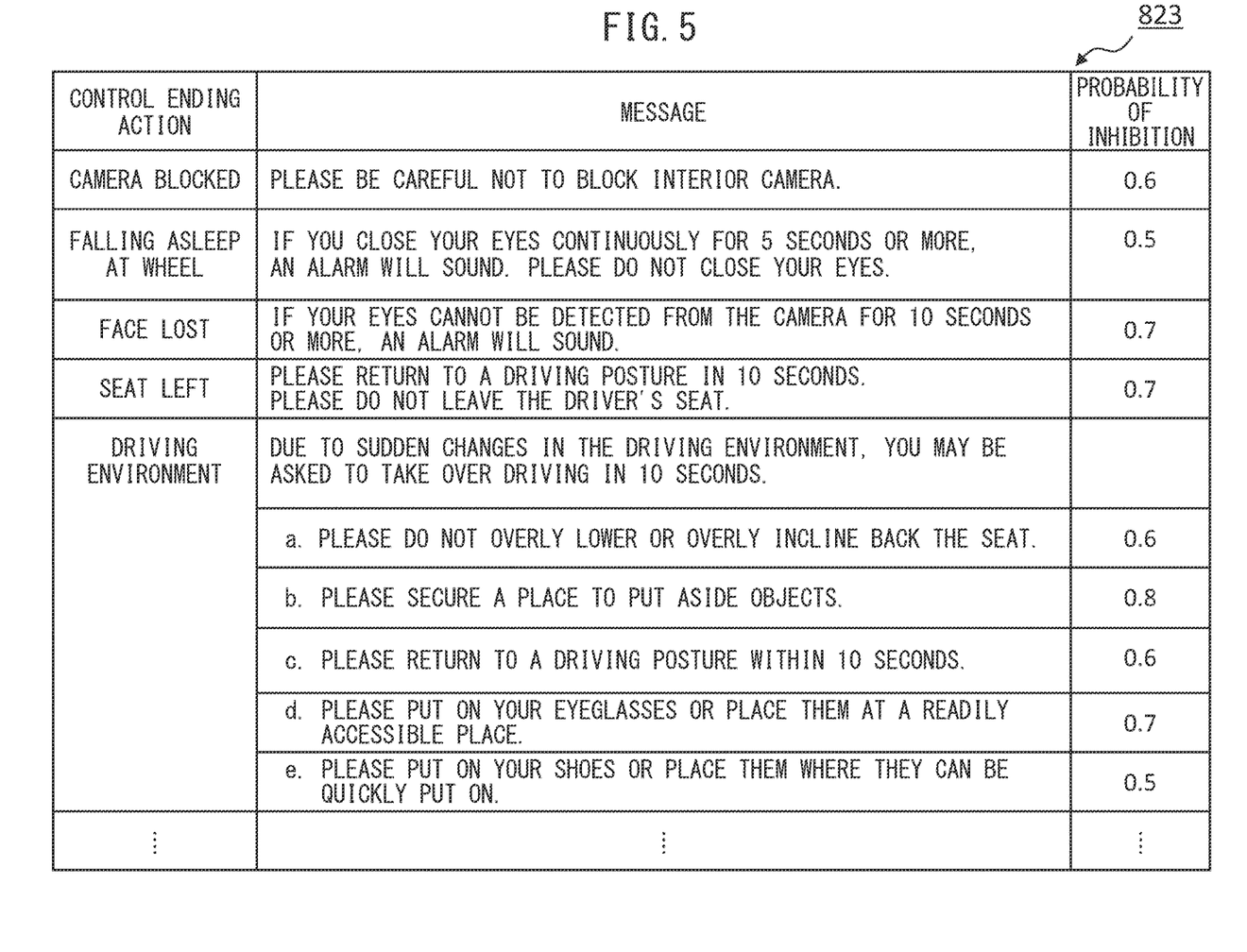
FIG. 5 explains an outline of a message table.

FIG. 5 explains an outline of a message table. The memory 82 stores the message table associating control ending actions with messages for inhibiting the control ending actions.

For example, in the message table 823, the control ending action "camera blocked" is associated with audio data for making the speaker device 4 play back the audio message "Be careful not to block interior camera".

In the message table 823, the control ending action "driving environment" is associated with the audio data for playing back the audio of the message "Due to sudden changes in the driving environment, you may be asked to take over driving in 10 seconds". The control ending action "driving environment" is further associated with audio data for playing back audio corresponding to the symbol indicating the type of the driving environment. According to such association, the notification device 8 can have the driver understand the action expected in conjunction with the message by, for example, notifying a message "Please do not overly lower or overly incline back the seat" after the message associated with the symbol "a" in the control ending action "driving environment", "Due to sudden changes in the driving environment, you may be asked to take over driving in 10 seconds".

In the message table 823, each message is associated with a probability of a corresponding control ending action being inhibited when the message is notified to the driver. For example, the symbol "a" in the control ending action "driving environment" is associated with the probability "0.6" of symbol "a" in the "driving environment" of the control ending action being inhibited in the case of notifying the message "Due to sudden changes in the driving environment, you may be asked to take over driving in 10 seconds", followed by the message "Please do not overly lower or overly incline back the seat".

The probability associated with each message is set based on a measured value obtained by notifying a message to a driver taking a predetermined action and determining whether the driver will take an expected control ending action. The probability associated with each message may be set based on an expectation by which inhibition of a control ending action is expected by notifying a driver taking a predetermined action by the message.

Each message may be associated with a probability of a control ending action being performed if the message were not notified to the driver in place or in addition to a probability of a corresponding control ending action being inhibited if notifying that message to the driver.

The messages in the message table 823 may also be text data for making the display device (not shown) display predetermined words.

The processor 83, which is an example of a control unit, includes one or more processors and a peripheral circuit thereof. The processor 83 may further include another operating circuit, such as a logic-arithmetic unit, an arithmetic unit, or a graphics processing unit.

Figure 6:
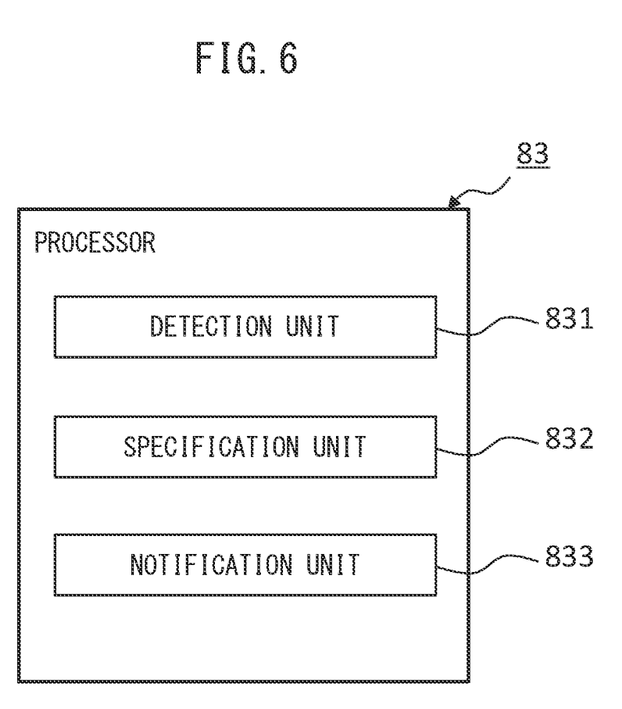
FIG. 6 is a functional block diagram of a processor included in the notification device.

FIG. 6 is a functional block diagram of the processor 83 included in the notification device 8.

As its functional blocks, the processor 83 of the notification device 8 includes a detection unit 831, a specification unit 832, and a notification unit 833. These units included in the processor 83 are functional modules implemented by a computer program stored in the memory 82 and executed on the processor 83. The computer program for achieving the functions of the units of the processor 83 may be provided in a form recorded on a computer-readable and portable medium, such as a semiconductor memory, a magnetic recording medium, or an optical recording medium. Alternatively, the units included in the processor 83 may be implemented in the notification device 8 as separate integrated circuits, microprocessors, or firmware.

The detection unit 831 detects a predetermined action of the driver from a driver image including a face region representing the face of the driver of the vehicle 1. The detection unit 831 also outputs a confidence rate indicating a certainty of the detection.

The detection unit 831 detects the positions of predetermined portions of the driver such as the hands and head of the driver, the facial direction of the driver, and the types and positions of objects present in the surroundings of the driver's seat by inputting driver images acquired from the driver monitor camera 3 in time series into a classifier. The detection unit 831 detects an action of the driver by identifying the behavior of the driver and the object of the same.

The classifier detecting the position of a predetermined portion of a driver, the facial direction of the driver, and the type and position of objects present in the surroundings of the driver's seat may be, for example, a convolutional neural network (CNN) including a plurality of convolution layers connected in series from the input toward the output. A CNN that has been trained in accordance with a predetermined training technique such as backpropagation using a plurality of images including a region in which at least one of the predetermined portion of the driver, the feature points of the face of the driver, and objects as training data operates as a classifier to identify the position of a predetermined portion of a driver, the position of feature points of the face of the driver, and the type and position of objects present in the surroundings of the driver's seat. The detection unit 831 compares the positions of feature points of the face of the driver detected with three-dimensional models of a standard face and detects the facial orientation in the three-dimensional model at which the positions of each feature points of the face most fit the positions of the corresponding part detected from the image, as the facial direction of the driver shown in the image. The classifier may be a support vector machine (SVM). By determining the support vector separating the region including a predetermined portion and region not including it, the SVM operates as a classifier for detecting a predetermined portion.

The detection unit 831 detects an action corresponding to the content of detection from the driver image by referring to the action detection table stored in the memory 82. For example, when a terminal and the situation that the driver is gazing in the direction of the dashboard are detected from a driver image, the detection unit 831 detects the action "staring at terminal" as the corresponding action. When a book and the situation that the driver is gazing in the direction of the hands are detected from a driver image, the detection unit 831 detects the action "reading a book".

The detection unit 831 detects an action based on the contents of detection from a series of driver images acquired in time series by referring to an action detection table stored in the memory 82. For example, the detection unit 831 detects the facial direction of the driver from the series of driver images. The detection unit 831 detects the action "looking around interior" when images in which the face is detected oriented in a range corresponding to a position in the interior of the vehicle such as the navigator's seat/back seats continue for a predetermined time period or more.

The classifier outputs a confidence rate indicating the certainty of the detection results for each of the predetermined portion of the driver, the feature points of the face of the driver, and objects present in the surroundings of the driver's seat detected from an image. The detection unit 831 calculates the confidence rate of detection of an action by, for example, multiplying the confidence rates for contents of detection from a driver image used for detection of the action (such as predetermined portion of the driver, feature point of face of the driver, and object present in the surroundings of the driver's seat, and the facial direction of the driver). The detection unit 831 may also calculate the average, maximum value, or minimum value of the confidence rate for the contents of detection from a driver image used for action detection as the confidence rate of detection of the action.

The detection unit 831 may further be configured to detect a control ending action of a driver from a driver image. For example, when the size of the region including consecutive pixels respectively having differences in luminance from surrounding pixels smaller than a predetermined luminance threshold is larger than a predetermined size threshold, the detection unit 831 detects the region as blocked object region where the camera is blocked by a blocking object. The detection unit 831 detects the control ending action "camera blocked" when a predetermined number of pixels of the driver image (for example, ⅓ or more of the total pixels) are included in a blocking object region. The detection unit 831, for example, detects the control ending action "face lost" when the face of the driver is not detected from the driver image at the time of detection by the classifier.

The specification unit 832 specifies a control ending action which possibly follows the action detected from a driver image referring to a control ending action table stored in the memory 82. For example, when the action "staring at terminal" is detected from a driver image, the specification unit 832 specifies "camera blocked" as the control ending action which possibly follows this.

The specification unit 832 also specifies a message for inhibiting a control ending action corresponding to the action detected by the driver image by referring to a message table stored in the memory 82. For example, when the action "staring at terminal" is detected from the driver image, the specification unit 832 specifies the message "Be careful not to block interior camera" for inhibiting the control ending action "blocking camera".

The notification unit 833 calculates the effectiveness level by multiplying the confidence rate at detection of a predetermined action by the probability of a control ending action being inhibited when notifying the driver of the message. The notification unit 833 also notifies the driver of a specified message through the speaker device 4 when the calculated effectiveness level is higher than a predetermined notification threshold stored in the memory 82.

When each message in the message table stored in the memory 82 is associated with a probability of a control ending action being performed when the message were not notified to the driver, the notification unit 833 may calculate the effectiveness levels by multiplying the probability and the confidence rate at detection of a predetermined action. In the determination of the effectiveness level in this case, the notification unit 833 may use a notification threshold different from the notification threshold used for determination of the effectiveness level calculated by using a probability of a control ending action being inhibited when notifying a driver of a message.

The notification unit 833 may store information for discriminating the message and the point of time of notification in the memory 82 when it notified the driver of a message. The notification unit 833 finds, before performing notification of the specified message, the elapsed time from the point of time when the message was last notified until the current time. The notification unit 833 inhibits (does not perform) notification of the specified message when the elapsed time is shorter than a predetermined message interval threshold (for example 60 seconds) stored in the memory 82. By the notification unit 833 operating in this way, the notification device 8 can reduce annoyance to the driver due to repeated notification of the same message in a short time period.

The notification unit 833 may also inhibit notification of the specified message when the elapsed time from the point of time when a message different from the specified message was recently notified until the current time is shorter than different message interval threshold. The different message interval threshold may be set at a value equal to or less than the message interval threshold (for example 30 seconds).

When the detection unit 831 is configured to detect a control ending action of a driver from a driver image, the notification unit 833 may notify the advance alert of end of control by the travel controller 7 in accordance with detection of a control ending action through the speaker device 4. At this time, the advance alert of end of control by the travel controller 7 may be notified by a mode with greater strength than notification of a message for inhibiting control ending action (in case of notification by a speaker device 4, for example, a higher volume). By the notification unit 833 operating in this way, the notification device 8 can suitably notify the driver of an advance alert of end of travel control.

The detection unit 831 may also inhibit notification of the specified message when the elapsed time from the point of time when an end notice of travel control based on detection of a control ending action corresponding to the specified message has recently been notified is shorter than a predetermined end notice interval threshold. The end notice interval threshold may be set at a value larger than a message interval threshold (for example 180 seconds). By the notification unit 833 operating in this way, the notification device 8 can reduce annoyance to the driver due to receiving a notification of a message relating to end notice of travel control already notified at a short interval.

The notification unit 833 may also inhibit notification of the specified message when the elapsed time from the point of time when an end notice of travel control based on detection of a control ending action different from the control ending action corresponding to the specified message was recently notified until the current time is shorter than different end advance alert interval threshold. The different end advance alert interval threshold may be set at a value equal to or less than the end notice interval threshold (for example 30 seconds).

Figure 7:
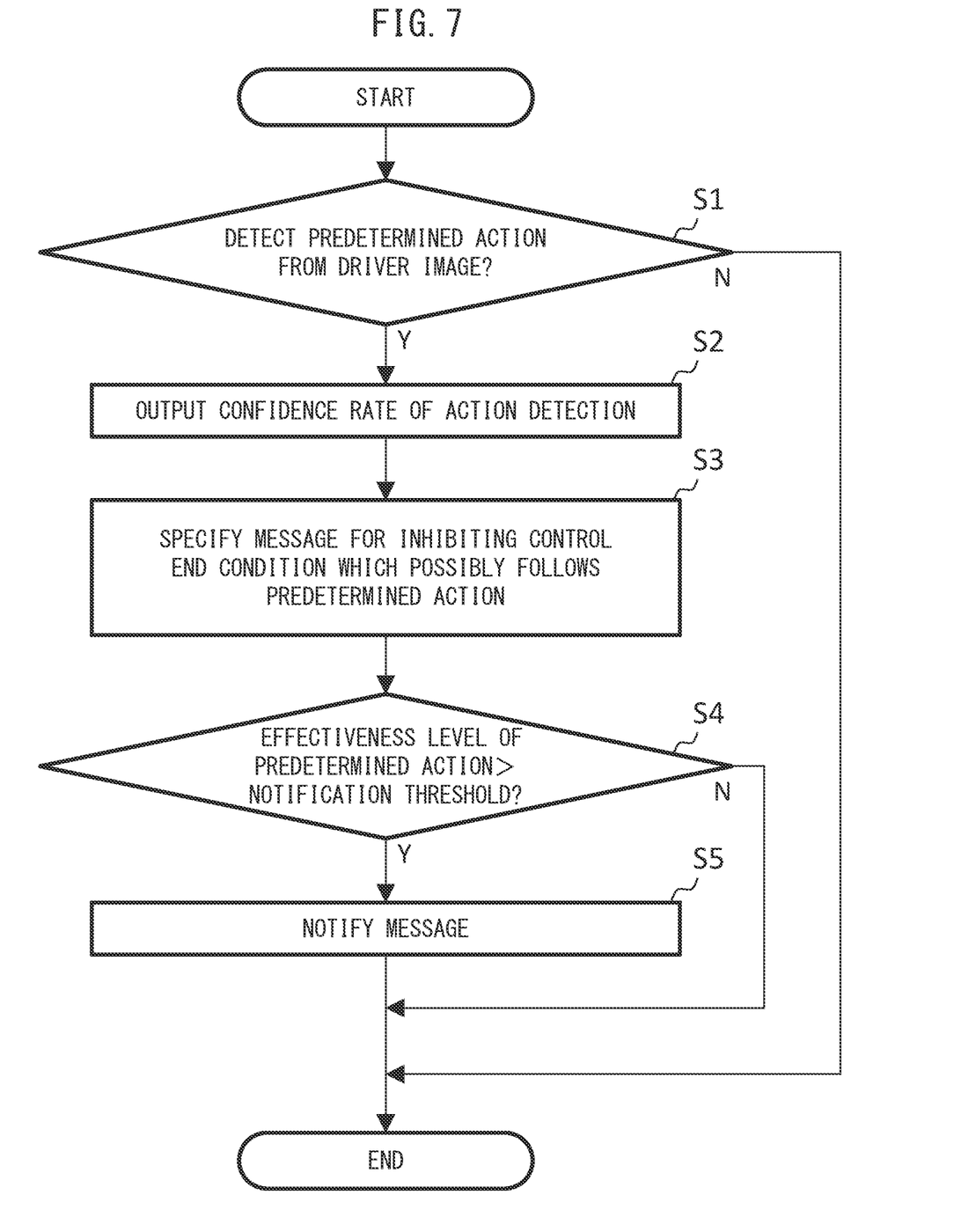
FIG. 7 is a flowchart of notification processing.

FIG. 7 is a flowchart of the notification processing. The notification device 8 repeatedly performs the processing shown in FIG. 7 at predetermined time intervals (for example 1 second intervals) while the vehicle 1 is traveling under control by the travel controller 7.

First, the detection unit 831 of the processor 83 of the notification device 8 detects a predetermined action of the driver from the driver image generated by the driver monitor camera 3 and including the face region of the driver of the vehicle 1 (step S1). When it is not detected (step S1: N), the detection unit 831 terminates the notification processing.

When a predetermined action of the driver is detected from the driver image (step S1: Y), the detection unit 831 outputs the confidence rate of the detection (step S2).

Next, the specification unit 832 of the processor 83 of the notification device 8 specifies the message for inhibiting a control ending action which possibly follows the detected action (step S3).

The notification unit 833 of the processor 83 of the notification device 8 calculates the effectiveness level by multiplying the confidence rate at the detection of the action by a predetermined probability of the control ending action being inhibited when the specified message is notified to the driver. Further, the notification unit 833 determines whether the calculated effectiveness level is higher than the notification threshold stored in the memory 82 (step S4)

When the calculated effectiveness level is determined higher than the notification threshold stored in the memory 82 (step S4: Y), the notification unit 833 notifies the specified message through the speaker device 4 to the driver (step S5) and terminates the notification processing. When the calculated effectiveness level is determined not higher than the notification threshold stored in the memory 82 (step S4: N), the notification unit 833 terminates the notification processing without notifying the specified message.

The notification device 8 can suitably notify a message to a driver of a vehicle so that autonomous driving can be continued longer.

According to a modification, the detection unit 831 determines whether a control ending action has been detected after a message was notified to the driver in the notification processing (step S4: Y→step S5). The detection unit 831 also calculates the probability of a control ending action being inhibited when a message is notified by dividing the number of times control ending action was not detected after the message was notified to the driver in the notification processing by the number of times the message was notified. the detection unit 831 also updates the probability associated with the message in the message table 823 stored in the memory 82 with the calculated probability.

The detection unit 831 may also determine whether a control ending action has been detected after a message was not notified in the notification processing (step S4: N→end). In this case, the detection unit 831 calculates the probability of a control ending action being performed when a message was not notified by dividing the number of times control ending action was detected after the message was not notified to the driver in the notification processing by the number of times the message was notified, and updates the probabilities in the message table 823 with the calculated probability.

The modification above can notify a message in accordance with the tendency of reaction of the driver of the vehicle 1 to a message.

In another modification, the detection unit 831 detects a control ending action from a driver image and calculates the detection frequency of control ending actions is (for example, once in 100 hours) while the travel controller 7 is controlling travel. The detection unit 831 may also update the notification threshold smaller than the notification threshold stored in the memory 82 when the calculated frequency is smaller than a frequency threshold stored in the memory 82 (for example, the calculated frequency is once in 100 hours while a frequency threshold is once in 80 hours).

A driver with a decreased detection frequency of control ending actions may have greater understanding of actions inviting an end of autonomous driving control. This modification can limit the chance of notification of a message to cases with higher effectiveness level and reduce the trouble imposed on the driver.

It should be noted that those skilled in the art can make various changes, substitutions, and modifications without departing from the spirit and scope of the present disclosure.

What is claimed is:

1. A notification device comprising a processor configured to:
    detect a predetermined action of a driver of a vehicle in which travel is controlled by an autonomous driving system from a driver image including a face region representing a face of the driver and output a confidence rate indicating a certainty in the detection,
    specify a message for inhibiting a control ending action which possibly follows the detected action and corresponds to an ending condition of control by the autonomous driving system, and
    notify the driver of the specified message through an output device when an effectiveness level is higher than a predetermined notification threshold, the effectiveness level calculated by multiplying the confidence rate by a first probability of the control ending action being inhibited when notifying the driver of the specified message or by a second probability of the control ending action being performed when not notifying the driver of the specified message, the first probability and the second probability being calculated, the second probability being calculated by dividing a number of times the control ending action was detected after the specified message was not notified to the driver by a number of times the specified message was notified.

2. The notification device according to claim 1, wherein the processor inhibits notification of the specified message when an elapsed time period from a point of time at which an identical message as the specified message was recently notified is shorter than a predetermined message interval threshold.

3. The notification device according to claim 2, wherein the processor further detects a control ending action of the driver from the driver image and,
    notifies a prior end notice of control by the autonomous driving system through an output device in a mode with higher volume than that used for notification of the message when the control ending action is detected.

4. The notification device according to claim 3, wherein the processor inhibits notification of the specified message when an elapsed time period from a point of time at which the prior end notice based on detection of the control ending action corresponding to the specified message was recently notified is shorter than a predetermined prior end notice interval threshold longer than the message interval threshold.

5. The notification device according to claim 1, wherein the effectiveness level is calculated by multiplying the confidence rate by the first probability, and the first probability is calculated by dividing a number of times the control ending action was not detected after the specified message was notified to the driver by a number of times the specified message was notified.

6. The notification device according to claim 5, wherein the first probability is variable based on a type of the control ending action.

7. The notification device according to claim 1, wherein the effectiveness level is calculated by multiplying the confidence rate by the second probability, and the second probability is variable based on a type of the control ending action.

8. A notification method comprising:
detecting a predetermined action of a driver of a vehicle in which travel is controlled by an autonomous driving system from a driver image including a face region representing a face of the driver and outputting a confidence rate indicating a certainty in the detection,
specifying a message for inhibiting a control ending action which possibly follows the detected action and corresponds to an ending condition of control by the autonomous driving system, and
notifying the driver of the specified message through an output device when an effectiveness level is higher than a predetermined notification threshold, the effectiveness level calculated by multiplying the confidence rate by a first probability of the control ending action being inhibited when notifying the driver of the specified message or by a second probability of the control ending action being performed when not notifying the driver of the specified message, the first probability and the second probability being calculated, the second probability being calculated by dividing a number of times the control ending action was detected after the specified message was not notified to the driver by a number of times the specified message was notified.

9. A non-transitory computer-readable medium having a computer program for notification stored therein, the computer program causing a computer mounted on a vehicle to execute a process comprising:
detecting a predetermined action of a driver of the vehicle in which travel is controlled by an autonomous driving system from a driver image including a face region representing a face of the driver and output a confidence rate indicating a certainty in the detection,
specifying a message for inhibiting a control ending action which possibly follows the detected action and corresponds to an ending condition of control by the autonomous driving system, and
notifying the driver of the specified message through an output device when an effectiveness level is higher than a predetermined notification threshold, the effectiveness level calculated by multiplying the confidence rate by a first probability of the control ending action being inhibited when notifying the driver of the specified message or by a second probability of the control ending action being performed when not notifying the driver of the specified message, the first probability and the second probability being calculated, the second probability being calculated by dividing a number of times the control ending action was detected after the specified message was not notified to the driver by a number of times the specified message was notified.

* * * * *